(12) United States Patent
Tohmaz et al.

(10) Patent No.: US 9,537,777 B1
(45) Date of Patent: Jan. 3, 2017

(54) ADJUSTING INPUT/OUTPUT OPERATION ARRIVAL TIMES TO REPRESENT A TOKEN BUCKET THAT ENFORCES MAXIMUM RATE AND BURST SIZE LIMITS

(71) Applicant: EMC Corporation, Hopkinton, MA (US)

(72) Inventors: Abdul S. Tohmaz, Cary, NC (US); Kenneth Hu, Lexington, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 3 days.

(21) Appl. No.: 14/672,696

(22) Filed: Mar. 30, 2015

(51) Int. Cl.
| | |
|---|---|
| *H04L 12/819* | (2013.01) |
| *H04L 12/801* | (2013.01) |
| *H04L 12/813* | (2013.01) |
| *G06F 13/42* | (2006.01) |
| *G06F 9/50* | (2006.01) |

(52) U.S. Cl.
CPC ............ *H04L 47/215* (2013.01); *H04L 47/10* (2013.01); *H04L 47/20* (2013.01); *G06F 9/5011* (2013.01); *G06F 13/4221* (2013.01)

(58) Field of Classification Search
CPC ........ H04L 47/215; H04L 47/10; H04L 47/20; G06F 9/5011; G06F 13/4221
See application file for complete search history.

(56) References Cited

U.S. PATENT DOCUMENTS

| | | | |
|---|---|---|---|
| 6,108,303 A * | 8/2000 | Fahmi ................. | H04L 12/5602 370/230 |
| 6,349,088 B1 * | 2/2002 | Ginzboorg .......... | H04L 12/5602 370/230 |
| 7,911,958 B2 | 3/2011 | Baden et al. | |
| 8,743,693 B2 | 6/2014 | Malhotra et al. | |
| 8,848,537 B2 | 9/2014 | Moran et al. | |
| 8,856,400 B1 * | 10/2014 | Davidson ............. | G06F 3/0617 710/17 |
| 2002/0110134 A1 * | 8/2002 | Gracon .................. | H04L 47/10 370/412 |
| 2003/0128667 A1 * | 7/2003 | Matsufuru ............. | H04L 45/60 370/230.1 |
| 2006/0146710 A1 * | 7/2006 | Roy .................... | H04L 12/5601 370/235 |
| 2008/0008095 A1 * | 1/2008 | Gilfix .................... | H04L 47/10 370/235 |
| 2008/0192636 A1 * | 8/2008 | Briscoe ................. | H04L 47/10 370/236 |
| 2009/0010165 A1 * | 1/2009 | Kim ....................... | H04L 47/10 370/235 |
| 2012/0127858 A1 * | 5/2012 | Ko ......................... | H04L 47/52 370/232 |

(Continued)

*Primary Examiner* — Benjamin Wu
(74) *Attorney, Agent, or Firm* — BainwoodHuang (57) ABSTRACT

In-band, on the fly allocation of tokens to a token bucket that limits the rate at which input/output operations are performed on a storage resource according to a maximum rate limit, while also supporting a user-configurable burst size limit that allows for a temporary spike in the rate input/output operations are received for the storage resource. An input/output time parameter is adjusted in response to receipt of input/output operations, based on the arrival times of the input/output operations, the maximum rate limit, and the burst size limit, in order to automatically allocate and consume tokens for the token bucket without requiring a separate token allocation thread.

12 Claims, 6 Drawing Sheets

(56) References Cited

U.S. PATENT DOCUMENTS

2014/0130055 A1* 5/2014 Guha ................ G06F 3/0604
718/104
2014/0279905 A1* 9/2014 Muniswamy-Reddy G06F 11/20
707/639

* cited by examiner

TABLE 400

| IO Count | IO Arrival Time (CT) | Time Since Last IO | First IO | IOT | Adjust IOT | IAT | Too fast | Adjust IOT | CT-IOT | Too much credit | Adjust IOT | Allowed |
|---|---|---|---|---|---|---|---|---|---|---|---|---|
| 1 | 10:00 | 0 | Yes | 10 | | | | | | | | Yes |
| 2 | 10.10 | 0.10 | No | | | 0.10 | Yes | | | | | No |
| 3 | 10.20 | 0.10 | No | | | 0.20 | Yes | | | | | No |
| 4 | 10.30 | 0.10 | No | | | 0.30 | No | 10.25 | 0.05 | No | | Yes |
| 5 | 10.40 | 0.10 | No | | | 0.15 | Yes | | | | | No |
| 6 | 10.50 | 0.10 | No | | | 0.25 | No | 10.50 | 0 | No | | Yes |
| 7 | 10.60 | 0.10 | No | | | 0.10 | Yes | | | | | No |
| 8 | 10.70 | 0.10 | No | | | 0.20 | Yes | | | | | No |
| 9 | 10.80 | 0.10 | No | | | 0.30 | No | 10.75 | 0.05 | No | | Yes |
| 10 | 10.90 | 0.10 | No | | | 0.15 | Yes | | | | | No |
| 11 | 11:00 | 0.10 | No | | | 0.25 | No | 12:00 | 0 | No | | Yes |

INPUT/OUTPUT OPERATIONS 450

Fig. 4

| IO Count 402 | IO Arrival Time (CT) 404 | Time Since Last IO 406 | First IO 408 | IOT 410 | Adjust IOT 412 | IAT 414 | Too fast 416 | Adjust IOT 418 | CT-IOT 420 | Too much credit 422 | Adjust IOT 424 | Allowed 426 |
|---|---|---|---|---|---|---|---|---|---|---|---|---|
| 1 | 10:00 | 0 | Yes | 10 | | | | | | | | Yes |
| 2 | 10.10 | 0.10 | No | | | 0.10 | Yes | | | | | No |
| 3 | 10.11 | 0.01 | No | | | 0.11 | Yes | | | | | No |
| 4 | 10.12 | 0.01 | No | | | 0.12 | Yes | | | | | No |
| 5 | 10.13 | 0.01 | No | | | 0.13 | Yes | | | | | No |
| 6 | 11.75 | 1.25 | No | | | 1.25 | No | 10.75 | 1:00 | Yes | | Yes |
| 7 | 11.80 | 0.05 | No | | | 0.80 | No | 11.25 | 0.55 | No | | Yes |
| 8 | 11.90 | 0.10 | No | | | 0.65 | No | 11.50 | 0.40 | No | | Yes |
| 9 | 12:00 | 0.10 | No | | | 0.50 | No | 11.75 | 0.25 | No | | Yes |
| 10 | 12.10 | 0.10 | No | | | 0.35 | No | 12:00 | 0.10 | No | 11:00 | Yes |
| 11 | 12.20 | 0.10 | No | | | 0.20 | Yes | | | | | No |

TABLE 400

INPUT/OUTPUT OPERATIONS 550

Fig. 5

TABLE 400

| IO Count | IO Arrival Time (CT) | Time Since Last IO | First IO (2) | IOT (3) | Adjust IOT (5) | IAT (6) | Too fast (7) | Adjust IOT (8) | CT-IOT (9) | Too much credit (9) | Adjust IOT (10) | Allowed |
|---|---|---|---|---|---|---|---|---|---|---|---|---|
| 1 | 10:00 | 0 | Yes | 10 | 9.25 | | | | | | | Yes |
| 2 | 10:10 | 0.10 | No | | | 0.85 | No | 9.50 | 0.60 | No | | Yes |
| 3 | 10:11 | 0.01 | No | | | 0.62 | No | 9.75 | 0.36 | No | | Yes |
| 4 | 10:12 | 0.01 | No | | | 0.37 | No | 10.00 | 0.12 | No | | Yes |
| 5 | 10:13 | 0.01 | No | | | 0.13 | Yes | | | | | No |
| 6 | 11.75 | 1.62 | No | | | 1.75 | No | 10.25 | 1.50 | Yes | 11:00 | Yes |
| 7 | 11.80 | .05 | No | | | 0.80 | No | 11.25 | 0.55 | No | | Yes |
| 8 | 11.90 | 0.10 | No | | | 0.65 | No | 11.50 | 0.40 | No | | Yes |
| 9 | 12:00 | 0.10 | No | | | 0.50 | No | 11.75 | 0.25 | No | | Yes |
| 10 | 12.10 | 0.10 | No | | | 0.35 | No | 12.00 | 0.10 | No | | Yes |
| 11 | 12.20 | 0.10 | No | | | 0.20 | Yes | | | | | No |

INPUT/OUTPUT OPERATIONS 550

Fig. 6

ADJUSTING INPUT/OUTPUT OPERATION ARRIVAL TIMES TO REPRESENT A TOKEN BUCKET THAT ENFORCES MAXIMUM RATE AND BURST SIZE LIMITS

BACKGROUND

As it is generally known, a token bucket is a mechanism that may be used to limit storage input/output (I/O) requests to a maximum rate set by a user. In a system in which a token bucket mechanism is used, when an I/O request is received, it can only be performed if there are sufficient tokens in the token bucket for the resource associated with the request. Otherwise, the request must either be rejected, or queued until the bucket contains a sufficient number of tokens for the request to be performed. For example, in systems in which the maximum rate limit is set by the user in terms of input/output operations per second (IOPS), each token may represent a single input/output operation, and accordingly a received input/output operation will only be performed if there is at least one token in the token bucket. Tokens may also sometimes be referred to as "credits".

In order to maintain a token bucket system, tokens must be allocated to the token bucket in a way that reflects the maximum rate set by the user.

SUMMARY

Previous technologies for allocating tokens to a token bucket that is used to limit the rate at which storage input/output (I/O) operations are performed to a maximum rate limit set by a user have exhibited significant shortcomings. For example, some previous systems have utilized an out-of-band token allocation thread to allocate tokens to the token bucket. In such previous approaches, tokens are allocated to the token bucket using a dedicated allocation thread, or a dedicated pool of allocation threads, according to a schedule that is based on the user-defined maximum rate limit. These previous approaches have significant drawbacks. First, since the tokens are allocated via the allocation thread or threads, and de-allocated via an I/O request processing thread, a lock is required on the token bucket to enforce mutual exclusion. Second, since different token buckets may have different maximum rate limits, providing token allocation across the different token buckets in a way that accurately reflects the different maximum rate limits gives rise to scalability issues. While scalability may be improved by allocating bulk amounts of tokens to some token buckets at lower frequencies relative to their maximum rate limits, such an approach introduces allocation accuracy issues.

To address the above described and other shortcomings of previous technologies, a new system is disclosed that effectively provides in-band, on the fly allocation of input/output operation tokens to a token bucket in order to limit the rate at which input/output operations may be performed on a storage resource according to a maximum rate limit set by a user. The disclosed system may also accommodate a user-configurable maximum burst size limit to allow for a temporary spike in the rate at which input/output operations are received for the storage resource that exceeds the maximum rate limit.

The disclosed system adjusts an input/output time parameter based on the arrival times of input/output operations received for a storage resource, the maximum rate limit, and the maximum burst size limit, in order to represent a token bucket that may be used to enforce the maximum rate limit and the maximum burst size limit set by the user. For example, the disclosed system sets a minimum permitted input/output operation inter-arrival time period to an inverse of the input/output operation maximum rate limit, and processes an initially received input/output operation by setting the input/output time parameter to an arrival time of the initial input/output operation. The disclosed system processes each subsequently received input/output operation by setting an inter-arrival time period parameter to a difference between an arrival time of the received input/output operation and the input/output time parameter, and determining whether the inter-arrival time period parameter is less than the minimum permitted input/output operation inter-arrival time. In response to determining that the inter-arrival time period parameter is not less than the minimum permitted input/output operation inter-arrival time, the disclosed system determines that there is at least one token available in the token bucket, and accordingly allows the input/output operation to be performed on the storage resource, and decrements the number of tokens in the token bucket by adding the minimum permitted input/output operation inter-arrival time to the input/output time parameter.

In another aspect of the disclosed system, processing of each input/output operation received subsequent to the initial input/output operation further includes determining that there is not at least one token available in the token bucket by determining that the inter-arrival time period parameter is less than the minimum permitted input/output operation inter-arrival time. The disclosed system accordingly prevents the received input/output operation from being performed on the storage resource.

In another aspect of the disclosed system, processing of each input/output operation received subsequent to the initial input/output operation further includes limiting the number of tokens in the token bucket to the size of an input/output operation burst size limit for input/output operations directed to the storage resource by, in response to determining that the inter-arrival time period parameter is not less than the minimum permitted input/output operation inter-arrival time, and after decrementing the number of tokens in the token bucket by adding the minimum permitted input/output operation inter-arrival time to the input/output time parameter, comparing the input/output time parameter to the arrival time of the received input/output operation and comparing a difference between the arrival time of the received input/output operation and the input/output time parameter to a result of multiplying the burst size limit and the minimum permitted input/output operation inter-arrival time. In response to determining that the input/output time parameter is less than the arrival time of the received input/output operation, and that the difference between the arrival time of the received input/output operation and the input/output time parameter is greater than the result of multiplying the burst size limit and the minimum permitted input/output operation inter-arrival time, the disclosed system sets the number of tokens in the token bucket to the size of the input/output operation burst size limit by setting the value of the input/output time parameter to the arrival time of the received input/output operation minus the result of multiplying the burst size limit by the minimum permitted input/output operation inter-arrival time.

In another aspect of the disclosed system, processing of the initially received input/output operation further includes setting the number of tokens in the token bucket to the size of an input/output operation burst size limit by subtracting the result of multiplying the burst size limit by the minimum permitted input/output operation inter-arrival time from the input/output time parameter.

The disclosed system may be embodied to provide significant advantages over previous technologies. For example, the disclosed system may eliminate the need for an out-of-band token allocation thread to allocate tokens to the token bucket. Instead, embodiments of the disclosed system may effectively provide token allocation to a token bucket without using a dedicated allocation thread, or a dedicated pool of allocation threads. Since an embodiment of the disclosed system may effectively allocate and consume tokens within the same I/O request processing thread, a lock is not required on the token bucket to enforce mutual exclusion. Additionally, in an environment in which different token buckets have different maximum rates, embodiments of the disclosed system may offer improved scalability over previous solutions that used independent token allocation threads. Moreover, the disclosed system need not introduce the problems of inaccuracy that may result from using independent token allocation threads to allocate bulk amounts of tokens to token buckets at relatively lower frequencies.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Figure 1:
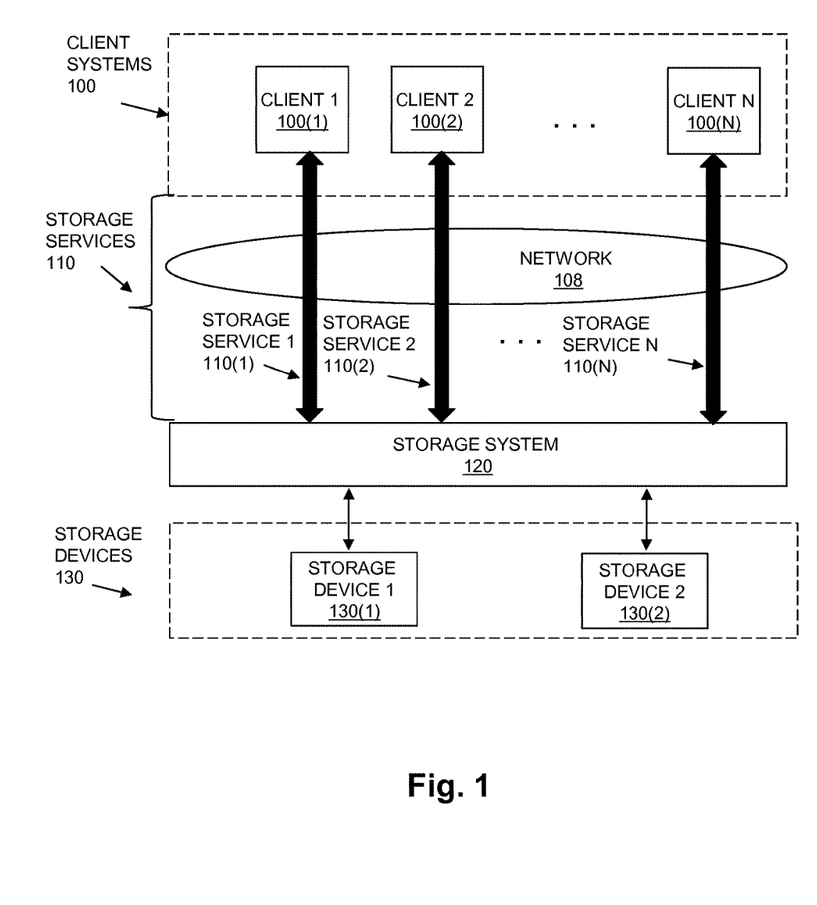
FIG. 1 is a block diagram showing components in an execution environment for an illustrative embodiment of the disclosed system.

FIG. 1 is a block diagram showing components in an execution environment for an illustrative embodiment of the disclosed system. As shown in FIG. 1, Client Systems 100, shown for purposes of illustration including Client 1 100(1) through Client N 100(N), are provided a number of Storage Services 110 from Storage System 120. The Storage Services 110 are shown for purposes of illustration as including Storage Service 1 110(1) through Storage Service N 110(N). Storage Services 110 are provided between the Storage System 120 and Client Systems 100 over one or more data communication networks, shown as Network 108.

FIG. 1 further includes Storage Devices 130, shown for purposes of illustration including Storage Device 1 130(1) and Storage Device 2 130(2). While Storage Devices 130 are shown directly physically connected to Storage System 120, the disclosed system is not so limited. In an alternative embodiment, Storage Devices 130 are communicably connected to Storage System 120 by way of one or more communication networks, e.g. including or consisting of a Storage Area Network (SAN) or the like.

During operation of the embodiment shown in FIG. 1, while providing Storage Services 110 to Client Systems 100, Storage System 120 allocates units of storage from Storage Devices 130 to store user data received from Client Systems 100.

The illustrative Client Systems 100 shown in FIG. 1 may be any specific type of computer system or device that consumes external storage provided through a storage service. For example, each of Client Systems 100 may include at least one processor, program storage, such as memory and/or another computer readable medium, for storing program code executable on the processor, and for storing data operated on by such program code. Each of Client Systems 100 may further include one or more input/output devices and/or interfaces, such as data communication and/or peripheral devices and/or interfaces. The program code executing on Client Systems 100 may further include appropriate operating system and/or client application software that provides and/or uses one or more of the Storage Services 110. Alternatively, each of Client Systems 100 may consist of, or include software that executes in whole or in part on, one or more virtual machines that are provided using a hypervisor or the like.

Storage System 120 may also include at least one processor and program storage, such as memory and/or another computer readable medium, for storing program code executable on the processor, and for storing data operated on by such program code. Storage System 120 may further include one or more input/output devices and/or interfaces, such as data communication and/or peripheral devices and/or interfaces. The program code executing on Storage System 120 may include software or firmware that provides one or more Storage Services 110. Alternatively, Storage System 120 may consist of, or include server software that executes, in whole or in part, on one or more server computer systems, or on virtual machines that are provided using a hypervisor or the like. In another embodiment, the Storage System 120 may be embodied in whole or in part as a storage appliance, such as a Network Attached Storage (NAS) appliance, i.e. a specialized device having integrated software, firmware, and/or hardware designed specifically for storing and serving files and/or blocks of data storage as need to support one or more specific storage services.

Each of the Storage Devices 130 shown in FIG. 1 may be embodied using any specific kind of data storage mechanism, including but not limited to one or more non-volatile storage devices, such as magnetic disk drives, electronic flash drives, and/or optical drives.

Each of the Storage Services 110 may be embodied as any specific type of storage service that provides units of external storage to a client system from a storage server. For example, one or more of Storage Services 110 may be embodied as file-based storage services that provide external storage of files for a respective client system, while allowing the externally stored files to be accessed as if they were located on the client system's local storage. Such file-based storage services may be based on the Network File System (NFS) protocol, the Server Message Block (SMB) or Common Internet File System (CIFS) application-layer network protocol, the Apple Filing Protocol (AFP), or other appropriate protocols.

One or more the of Storage Services 110 may alternatively be embodied as block-based storage services that provide external storage in the form of blocks served by storage systems from disk storage devices. For example, one or more of Storage Services 110 may be embodied as block-based storage services employing the Internet Small Computer System Interface (iSCSI), and allowing the respective client system to access external storage from the storage system as if it were from a locally attached disk. Such block-based storage services may also use Fibre Channel (FC) network technology, and/or the Serial Attached SCSI (SAS) protocol or the like in the context of Direct Attached Storage (DAS).

Figure 2:
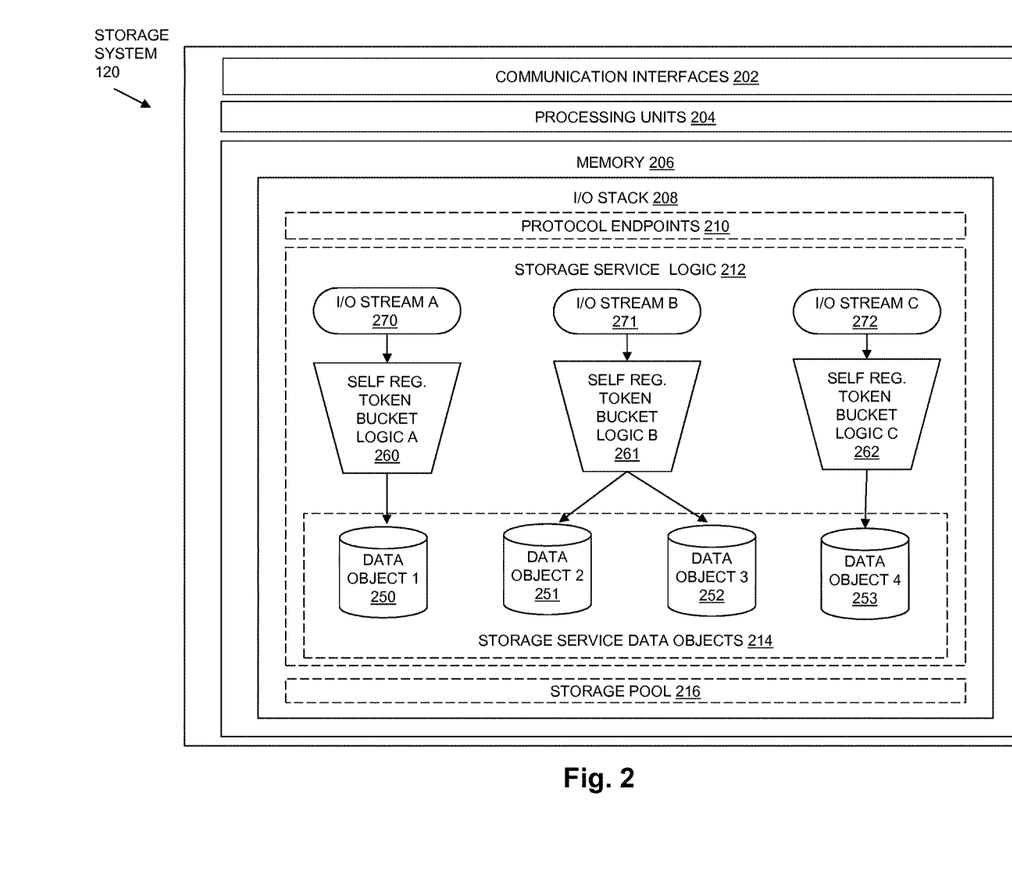
FIG. 2 is a block diagram showing an example of components in an illustrative storage system embodiment of the disclosed system.

FIG. 2 is a block diagram showing an example of components in a illustrative embodiment of the disclosed system provided within Storage System 120. The Storage System 120 operates to receive I/O operations from at least one client system while providing a storage service to the client system, according to both block-based and file-based protocols, and to respond to such I/O operations by reading user data from or writing user data to the Storage Devices 130 (FIG. 1). In the embodiment of FIG. 2, the Storage System 120 includes one or more Communication Interfaces 202, a set of Processing Units 204, and Memory 206. The Communication Interfaces 202 include, for example, SCSI target adapters and network interface adapters for converting electronic and/or optical signals received over a network into electronic form for use by the Storage System 120. The set of Processing Units 204 includes one or more processing chips and/or assemblies. The Memory 206 includes both volatile memory (e.g., RAM), and non-volatile memory, such as one or more ROMs, disk drives, solid state drives, and the like. The set of Processing Units 204 and the Memory 206 together form control circuitry, which is constructed and arranged to carry out various methods and functions as described herein, e.g., alone or in coordination with similar control circuitry on one or more other data storage systems. The Memory 206 includes a variety of software constructs realized in the form of executable instructions. When the executable instructions are run by the set of Processing Units 204, the set of Processing Units 204 are caused to carry out the operations of the software constructs. Although certain software constructs are specifically shown and described, it is understood that the Memory 206 may include various other software constructs, which are not shown, such as an operating system, various applications, processes, and/or daemons.

In the illustrative embodiment of FIG. 2, the Memory 206 includes an I/O Stack 208. The I/O Stack 208 provides an execution path for I/O operations received from client systems while providing one or more storage services to the client systems. The I/O Stack 208 is shown including Protocol End Points 210, Storage Service Logic 212, and Storage Pool 216. Those skilled in the art will also recognize that the I/O Stack 208 shown in FIG. 2 is simplified for purposes of concise explanation and illustration of the disclosed system, and that various components and/or elements other than those shown in FIG. 2 may also be present in the I/O Stack 208. While I/O operations received from client systems enter the I/O Stack 208 from the top and propagate downwards, the components of the I/O Stack 208 are described herein from the bottom to the top for ease of understanding.

The Storage Pool 216 organizes elements of the Storage Devices 130 (FIG. 1) into units of storage used by the Storage System 120 to provide one or more storage services. For example, in one embodiment, the Storage Pool 216 organizes elements of the Storage Devices 130 into "slices". A "slice" is an example of a unit of storage space (e.g. 256 megabytes or 1 gigabytes in size), which is derived from Storage Devices 130. The Storage Pool 216 allocates slices of the Storage Devices 130 to be used by the Storage Service Logic 212 to form Storage Service Data Objects 214 that are used to support storage services provided to client systems. For example, the Storage Pool 216 may allocate slices to objects in Storage Service Data Objects 214 that support file-based storage services, such as file systems or the like, and/or file-based virtual volumes (VVols). Alternatively, the Storage Pool 216 may allocate slices for objects in Storage Service Data Objects 214 that support block-based storage services, such as logical disks or logical units (LUNs), and/or block-based virtual volumes (VVols). The Storage Pool 216 may also de-allocate slices from Storage Service Data Objects 214 if the storage provided by the slices is no longer required. In this way, the Storage Service Data Objects 214 for both file-based and block-based storage services are built upon units of storage managed by the Storage Pool 216.

The Protocol End Points 210 expose the Storage Service Data Objects 214 to client systems for access by the client systems in accordance with respective storage service protocols. Thus, the Protocol End Points 210 may expose block-based objects (e.g., LUNs and block-based VVols) through Fiber Channel or iSCSI protocols, and/or may expose file-based objects (e.g., file systems and file-based VVols) using NFS, CIFS, or SMB protocols.

In the illustrative embodiment shown in FIG. 2, the Storage Service Data Objects 214 include Data Object 1 250, Data Object 2 251, Data Object 3 252, and Data Object 4 253. The Storage System 120 receives I/O operations for Data Object 1 250, Data Object 2 251, Data Object 3 252, and Data Object 4 253 through some number of the Protocol Endpoints 210. For example, the I/O operations for Data Object 1 250 are shown by I/O Stream A 270, the I/O operations for Data Object 2 251 and Data Object 3 252 are shown by I/O Stream B 271, and the I/O operations for Data Object 4 253 are shown by I/O Stream C 272. The processing of the I/O operations in each of I/O streams 270, 271 and 272 is limited by a respective one of Self-Regulating Token Bucket Logic A 260, Self-Regulating Token Bucket Logic B 261 and Self-Regulating Token Bucket Logic C 262. Specifically, Self-Regulating Token Bucket Logic A 260 limits the processing of I/O Stream A 270, Self-Regulating Token Bucket Logic B 261 limits the processing of I/O Stream B 271, and Self-Regulating Token Bucket Logic C 262 limits the processing of I/O Stream C 271.

The disclosed system uses a token bucket mechanism to enforce a maximum rate limit and a burst size limit. Both the maximum rate limit and the burst size limit may be user-configurable parameters. The disclosed system may further allow the user to configure a parameter indicating whether or not initial bursts are allowed. The maximum rate limit, burst size limit, and initial burst indication configuration parameters may be associated with the specific storage service data object that is the target of the respective I/O stream. Accordingly, Self-Regulating Token Bucket Logic A 260 limits I/O Stream A 270 according to configuration parameters associated with Data Object 1 250, Self-Regulating Token Bucket Logic B 261 limits I/O Stream B 271 according to configuration parameters associated with Data Object 2 251 and Data Object 3 252, and Self-Regulating Token Bucket Logic C 262 limits I/O Stream C 272 according to configuration parameters associated with Data Object 4 253.

Each one of Self-Regulating Token Bucket Logics A 260, B 261 and C 262 adjusts an I/O time parameter in response to receipt of I/O operations from the corresponding one of I/O Streams A 270, B 271, and C 272, in order to represent the available tokens in a token bucket. For example, FIG. 3 is a flow chart showing steps that may be performed by one of Self-Regulating Token Bucket Logics A 260, B 261 and C 262 to adjust an input/output time parameter based on the arrival times of the input/output operations received from a respective one of I/O Streams A 270, B 271, and C 272, and on the user configured maximum rate limit, burst size limit, and initial burst indication for the respective storage service data object, in order to allocate and consume tokens in a way that enforces the maximum rate limit, maximum burst size limit, and initial burst indication as configured by the user, without requiring a separate token allocation thread or thread.

Figure 3:
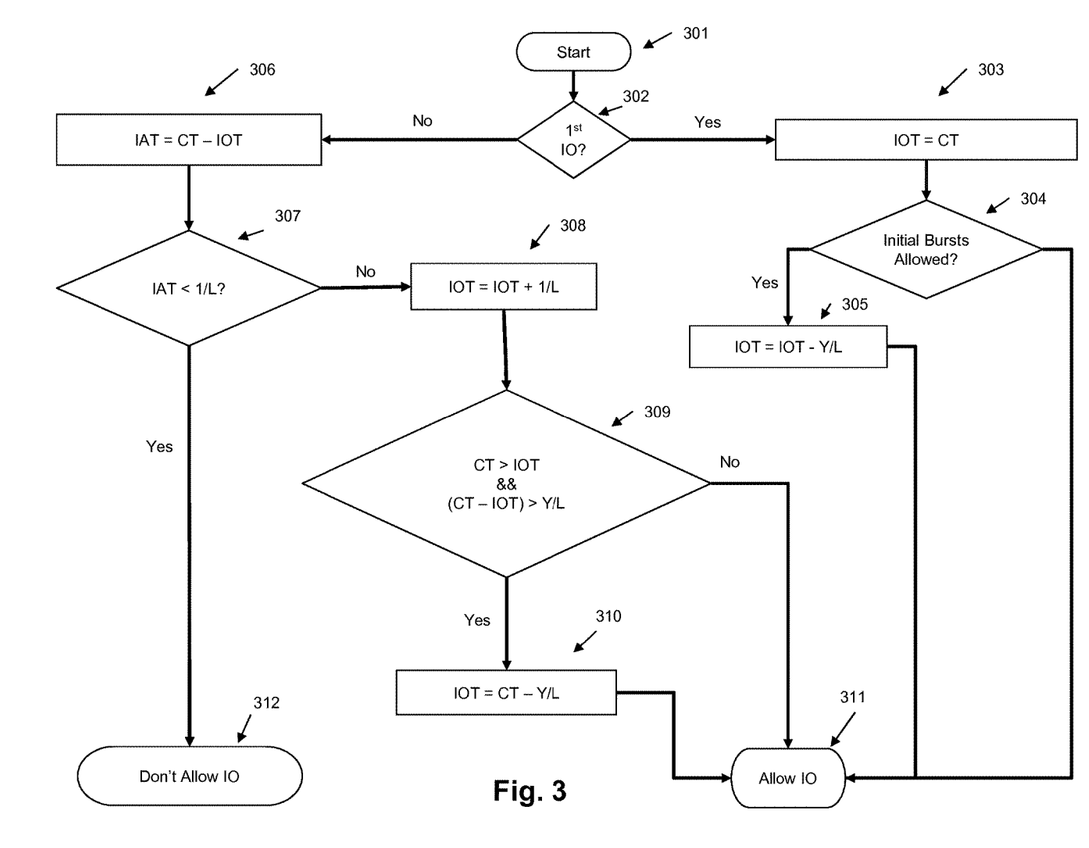
FIG. 3 is a flow chart showing an example of steps performed by one or more components in an illustrative embodiment.

In FIG. 3 and the following explanation, the following definitions apply:

L is the input/output maximum rate limit set by the user, in input/output operations per second;

R is the rate at which input/output operations arrive at the self-regulating token bucket logic, in input/output operations per second;

Y is the maximum burst size limit, as a number of input/output operations;

IOT is an input/output time parameter that is adjusted in response to the receipt of input/output operations, based on the arrival times of the input/output operations, the maximum rate limit, the burst size limit, and an initial burst indication, in order to represent a token bucket that enforces the maximum rate limit, maximum burst size limit, and initial burst indication as configured by the user;

CT is the current time, i.e. the arrival time of the most recently received input/output operation;

IAT is an inter-arrival time calculated as the time difference between CT and IOT;

1/L is the minimum time allowed between two consecutive input/output operations (i.e. the minimum permitted input/output operation inter-arrival time period), and may be set by the self-regulating token bucket logic to an inverse of the input/output operation maximum rate limit L; and Y/L is the total amount of time needed for Y input/output operations to flow at rate L (i.e. equal to the result of multiplying the burst size limit Y and the minimum permitted input/output operation inter-arrival time 1/L).

Through the process shown in the steps of the flowchart of FIG. 3, a received input/output operation is performed on the storage service data object if and only if 1) R<=L
OR
2) The number of available tokens in the token bucket can cover the number of input/output operations received at a rate that exceeds L.

Further during the process shown in the steps of the flowchart in FIG. 3, the number of available tokens in the token bucket is adjusted while processing the received input/output operations as follows:

1) if R=L, the number of available tokens in the token bucket is not adjusted and left at its current value;

2) if R<L, the number of available tokens in the token bucket is allowed to increase at a rate equal to L−R, up to a maximum value of Y; and 3) if R>L, the number of available tokens in the token bucket is decreased at a rate equal to R−L, to a minimum value of zero.

The process starts at 301 with the receipt of an input/output operation. At step 302 the self-regulating token bucket logic determines whether the input/output operation is the initial input/output operation. If so, step 302 is followed by step 303, in which the self-regulating token bucket logic sets the input/output time parameter IOT to an arrival time CT of the initial input/output operation. At step 304, the self-regulating token bucket logic determines whether the user has configured an initial burst parameter to indicate that initial bursts are to be allowed. If so, then step 304 is followed by step 305, in which the self-regulating token bucket logic sets the number of tokens in the token bucket to the burst size limit by decrementing the input/output time parameter IOT by Y/L, i.e. by the total amount of time needed for Y input/output operations to flow at rate L. In other words, at step 305 the self-regulating token bucket logic adjusts the value of the input/output time parameter IOT downwards (i.e. backwards in terms of time) by Y/L, in order to allow for a burst of Y input/output operations flowing at rate L. Step 305 is followed by step 311, in which the input/output operation is allowed to be processed, e.g. issued to and performed on an associated storage resource, such as one of the Storage Service Data Objects 214 shown in FIG. 2.

Otherwise, in the case where the self-regulating token bucket logic determines at step 304 that the user has not configured the initial burst parameter to indicate that initial bursts are to be allowed, step 304 is followed directly by step 311.

After processing the initially received input/output operation, the self-regulating token bucket logic processes each subsequently received input/output operation by first branching from step 302 to step 306. In step 306, the self-regulating token bucket logic processes the subsequently received input/output operation by setting the inter-arrival time period parameter IAT to a difference between a current time CT (i.e. the arrival time of the received input/output operation) and the value of the input/output time parameter IOT. By setting the inter-arrival time period parameter IAT to the difference between the arrival time of the received input/output operation and the value of the input/output time parameter IOT, the disclosed system causes the value of IAT to reflect both the current amount of available tokens, as represented by the value of the input/output time parameter IOT, and the rate at which the input/output operation was received, as represented by the arrival time CT of the received input/output operation.

In step 307, the self-regulating token bucket logic determines whether the resulting inter-arrival time period parameter IAT is less than the minimum permitted input/output operation inter-arrival time 1/L. In response to determining at step 307 that the inter-arrival time period parameter IAT is not less than the minimum permitted input/output operation inter-arrival time 1/L, the self-regulating token bucket logic determines that there is at least one token available in the token bucket, and accordingly allows the input/output operation to be performed on the associated storage resource at step 311. At step 308 the self-regulating token bucket logic decrements the number of tokens in the token bucket to reflect the allowed input/output operation, by adding the minimum permitted input/output operation inter-arrival time 1/L to the input/output time parameter IOT. In other words, at step 308 the self-regulating token bucket logic adjusts the value of input/output time parameter IOT upward (i.e. forward in terms of time) by the minimum time period allowed between two consecutive input/output operations, so that the adjusted value of input/output time parameter IOT reflects the consumption of one token (i.e. the token consumed to allow the input/output operation to be performed on the associated storage resource at step 311).

If the self-regulating token bucket logic determines at step 307 that the inter-arrival time period parameter IAT is less than the minimum permitted input/output operation inter-arrival time 1/L, then the self-regulating token bucket logic determines that there are no tokens available in the token bucket, and step 307 is followed by step 312. At step 312 the self-regulating token bucket logic prevents the received input/output operation from being issued to or performed on the storage service data object. For example, at step 312 the Storage System 120 may transmit a message back to the client system that originally requested the received input/output operation, indicating to the client system that the input/output operation was not performed. Such a message may further indicate to the client system that future input/output operations to the storage service data object should be requested at a slower rate. Alternatively, the input/output operation may simply be discarded at step 312.

In steps 309 and 310, as part of processing each input/output operation received subsequent to the initial input/output operation, the self-regulating token bucket logic may further operate to limit the number of tokens in the token bucket to the size Y of the input/output operation maximum burst size limit. As shown in FIG. 3, step 309 may be performed after determining at step 307 that the inter-arrival time period parameter IAT is not less than the minimum permitted input/output operation inter-arrival time 1/L, and after decrementing the number of tokens in the token bucket at step 308 by adding the minimum permitted input/output operation inter-arrival time 1/L to the input/output time parameter IOT.

In step 309, the self-regulating token bucket logic determines whether the number of tokens in the token bucket exceeds the maximum burst size limit Y. For example, at step 309, the self-regulating token bucket logic compares the input/output time parameter IOT to the current time CT, which is the arrival time of the received input/output operation. Also at step 309, the self-regulating token bucket logic compares the difference between the current time CT (i.e. the arrival time of the received input/output operation) and the input/output time parameter IOT to Y/L. If the input/output time parameter IOT is less than the arrival time of the received input/output operation, and the difference between the arrival time of the received input/output operation and the input/output time parameter IOT is greater than Y/L, then the number of tokens in the token bucket exceeds the maximum burst size limit Y, and step 309 is followed by step 310. In step 310, the self-regulating token bucket logic sets the number of tokens in the token bucket to the size of the input/output operation burst size limit Y, by adjusting the value of the input/output time parameter IOT such that the value of the input/output time parameter IOT is equal to the arrival time of the received input/output operation (i.e. CT) minus Y/L.

Figure 4:
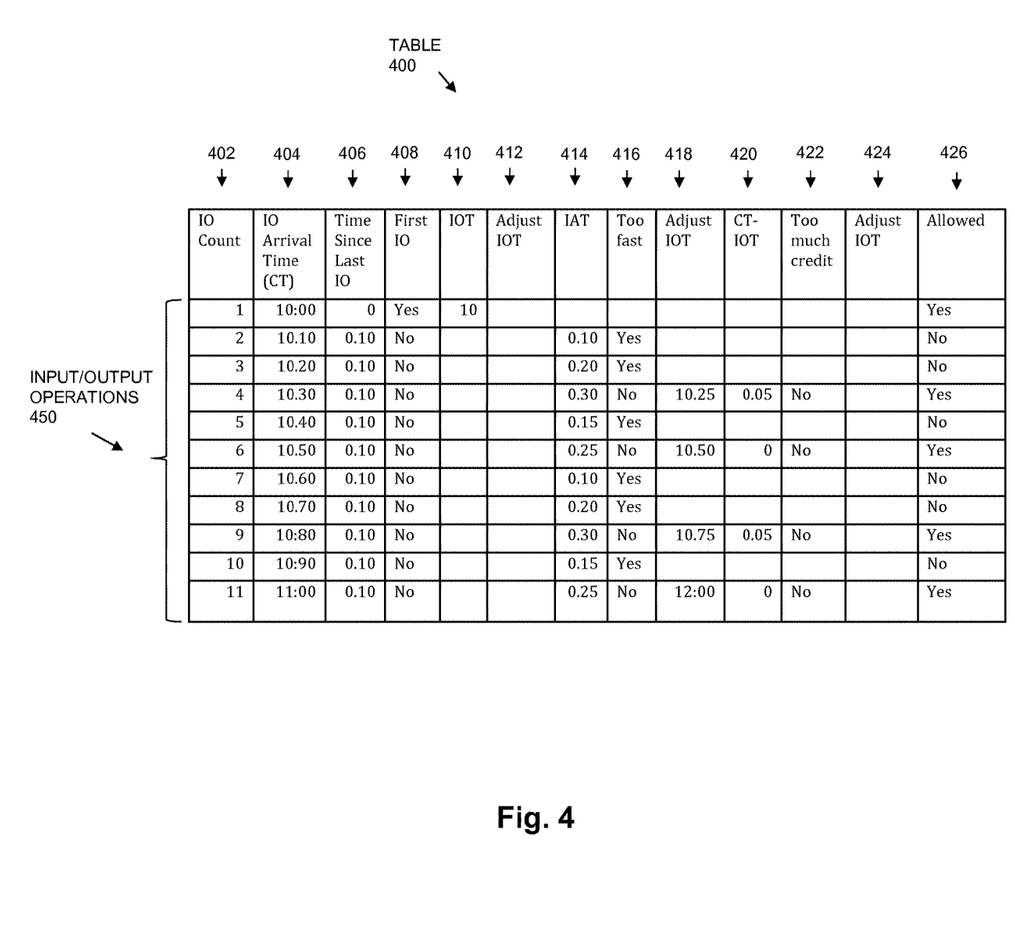
FIG. 4 is a table illustrating the processing of a first series of input/output operations according to the steps in the flow chart of FIG. 3.

FIG. 4 is a table illustrating the processing of a first series of input/output operations according to the steps in the flow chart of FIG. 3. Specifically, the contents of Table 400 in FIG. 4 reflects the operation of the disclosed system in response to receipt of a series of input/output operations, e.g. Input/Output Operations 450. For example, each row of Table 400 shows the results of performing the steps of FIG. 3 with regard to a corresponding one of the input/output operations in Input/Output Operations 450. Column 402 is a count associated with each specific input/output operation, such that the first received input/output operation may be referred to as input/output operation 1, the second received input output/operation may be referred to as input/output operation 2, etc. Column 404 shows the arrival time CT of the input/output operation. Column 406 shows the amount of time since the last input/output operation was received. Column 408 shows the result of step 302 in FIG. 3, which determines whether the input/output operation is the initial input/output operation (i.e. "Yes" indicates the initial input/output operation, "No" indicates a subsequent input/output operation). Column 410 shows the value of the input/output time parameter IOT after being initially set in step 303 to the arrival time of the initial input/output operation. Column 410 only includes a value if step 303 is performed for the input/output operation. Column 412 shows the value of the input/output parameter IOT after the input/output parameter IOT is decremented by Y/L in step 305. Column 412 only includes a value if step 305 is performed for the input/output operation.

If step 306 is performed for the input/output operation, column 414 shows the value of the inter-arrival time period parameter IAT after being set to the difference between a current time CT (i.e. the arrival time of the received input/output operation) and the value of the input/output time parameter IOT. Accordingly, column 414 only includes a value if step 306 is performed. Column 416 shows the result of the determination made at step 307. If the determination at step 307 is that the inter-arrival time period parameter IAT is less than the minimum permitted input/output operation inter-arrival time 1/L, and that accordingly processing of the input/output operation will not be allowed, then column 416 has "Yes" as a value. Otherwise column 416 has "No" as a value. If step 307 is not performed, then column 416 has no value.

If step 308 is performed, column 418 shows a value of the input/output parameter IOT after it is adjusted at step 308. Otherwise, column 418 shows no value.

Column 420 shows the result of subtracting the value of the input/output parameter IOT from the arrival time of the input/output operation (i.e. CT) during step 309. Column 422 shows the result of comparing the result in column 420 to Y/L, i.e. "No" if the result in column 420 is not greater than Y/L, and "Yes" if the result in column 420 is greater than Y/L. Columns 420 and 422 only have contents if step 309 is performed for the input/output operation.

If step 310 is performed, then column 424 shows the result of adjusting the value of the input/output time parameter IOT at step 310. Otherwise, column 424 shows no value. Column 426 indicates whether the input/output operation was allowed to be performed on the associated storage resource. For example, column 426 contains "Yes" if the input/output operation was allowed to be performed on the storage resource at step 311, and contains "No" if the input/output operation was prevented from being performed on the storage resource at step 312.

In FIG. 4 the contents of Table 400 shows the results of the steps of FIG. 3 being performed in response to receipt of Input/Output Operations 450. In the example of FIG. 4, the user has set the maximum rate limit to a rate of 4 input/output operations per second, and has set the maximum burst size limit to 3 input/output operations. The user has also set the initial burst parameter to indicate that initial bursts are not to be allowed. The below are accordingly true for the example of FIG. 4:

L=4 input/output operations per second
1/L=0.25 seconds
Y=3 input/output operations
Y/L=¾=0.75 seconds In the example of FIG. 4, the Input/Output Operations 450 arrive at a constant rate R that is equal to 10 input/output operations per second. After one second has passed following the initial input/output operation (i.e. between the arrival times of 10:00 and 11:00 seconds), the self-regulating token bucket logic has allowed a total of 4 input/output operations to be performed, thus correctly matching the maximum rate limit of 4 input/output operations per second.

Figure 5:
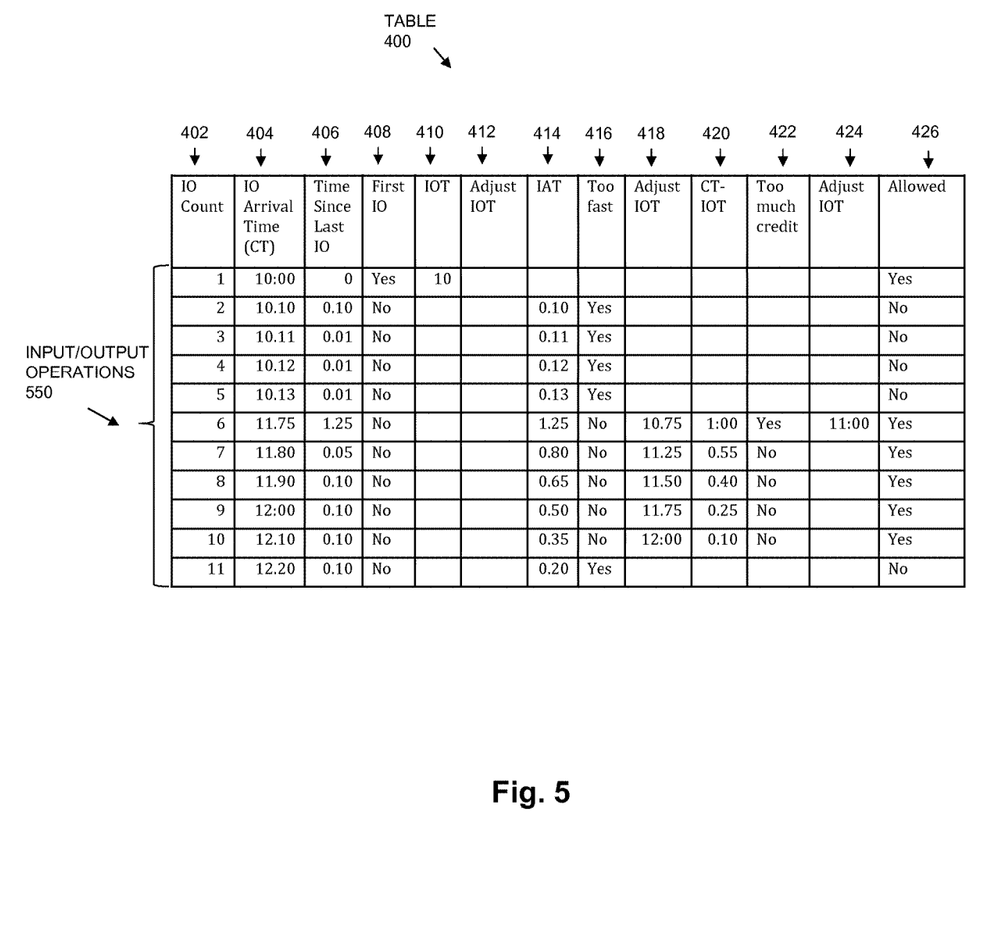
FIG. 5 is the table of FIG. 4 illustrating the processing of a second series of input/output operations according to the steps in the flow chart of FIG. 3.

FIG. 5 shows the Table 400 having contents resulting from receipt of a different set of input/output operations, i.e. Input/Output Operations 550. The example of FIG. 5 uses the same values for L, 1/L and Y/L as were used in the example of FIG. 4. In contrast to the example of FIG. 4, in FIG. 5 the rate at which input/output operations arrive in Input/Output Operations 550 varies, such that there is an initial burst (i.e. input/output operations 2-5), followed by a gap in time (i.e. between input/output operations 5 and 6), and then another burst (i.e. input/output operations 6-11). Since the user set the value of the initial burst parameter to indicate that initial bursts were not to be allowed, none of the input/output operations 2-5 were allowed to be performed. The gap in time between input/output operations 5 and 6 allowed tokens in the token bucket to build up to the maximum burst size limit of 3, as shown by the adjusted value of 11:00 for input/output time parameter IOT shown in column 424 for input/output operation 6. The adjusted value of 11:00 for IOT shown in column 424 for input/output operation 6 indicates that step 310 was performed for input/output operation 6, in order to prevent the input/output time parameter IOT from representing more than the maximum burst limit number Y of available tokens.

Figure 6:
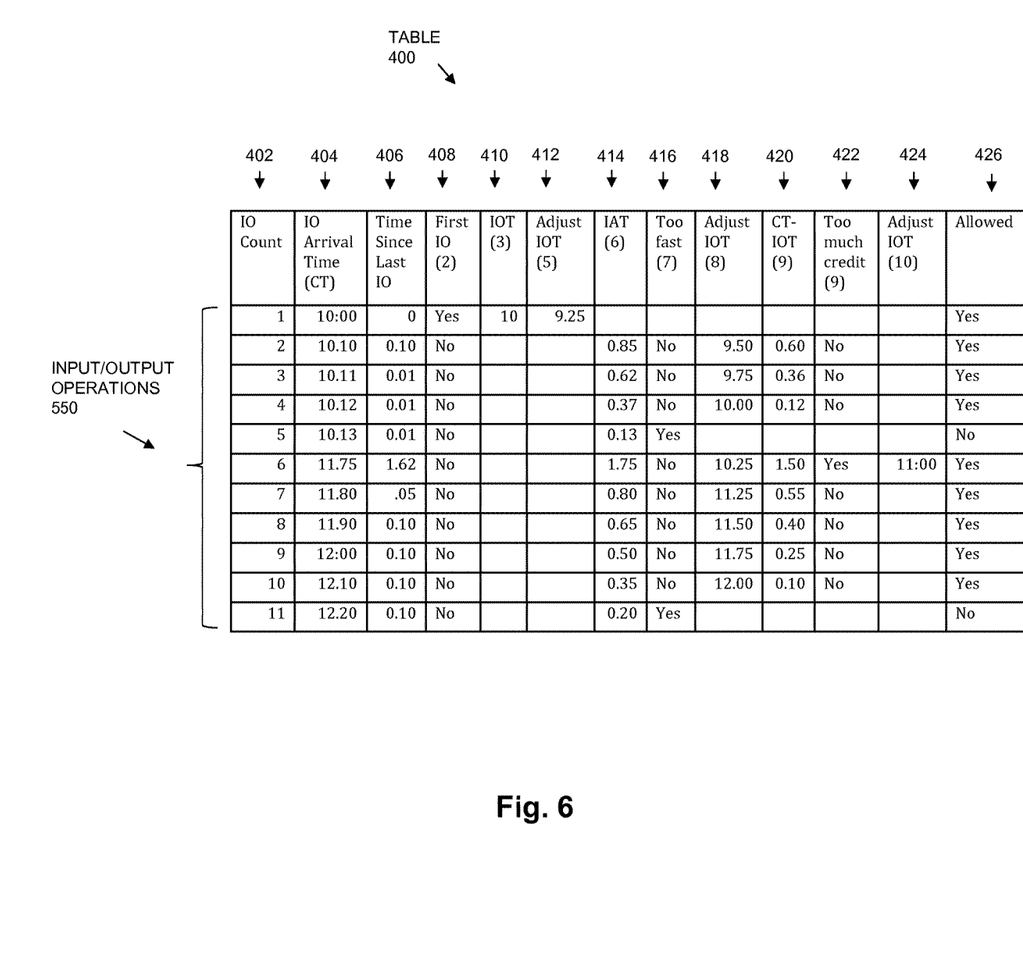
FIG. 6 is the table of FIG. 4 illustrating the processing of the series of input/output operations from FIG. 5 according to the steps of the flow chart of FIG. 3, albeit with the initial burst parameter set to indicate that initial bursts are allowed.

FIG. 6 shows Table 400 containing the results of performing the steps of FIG. 3 on the series of Input/Output Operations 550 from FIG. 5, albeit with the initial burst parameter set by the user to indicate that initial bursts are to be allowed. Accordingly, column 412 shows that step 305 was performed for the initial input/output operation, causing the value of the input/output time parameter IOT to be set to 9.25 when the initial input/output operation was processed. As a result, in the example of FIG. 6 the initial burst of input/output operations 2-5 is allowed to be performed on the storage service data object.

Those skilled in the art will recognize that the disclosed system is significantly more than merely the abstract idea of a token bucket for limiting the rate at which arriving input/output operations may be processed. Instead, the disclosed system addresses various specific shortcomings arising in previous technical solutions, including shortcomings arising from the use of independent, out-of-band allocation threads to allocate tokens to a token bucket. In contrast, embodiments of the disclosed system may effectively provide token allocation to a token bucket without using a dedicated allocation thread, or a dedicated pool of allocation threads. Since the disclosed system may be embodied to allocate and consume tokens within the same I/O request processing thread, a lock is not required on the token bucket to enforce mutual exclusion. Additionally, in an environment in which different token buckets have different limit maximum rates, embodiments of the disclosed system may offer improved scalability over previous solutions that used independent token allocation threads, and without introducing the problems of inaccuracy that may result when independent token allocation threads are used to allocate bulk amounts of tokens to token buckets at relatively lower frequencies.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above. In particular, while the above description includes a client-server embodiment, the disclosed system is not limited to a client-server configuration, and may alternatively be embodied within a single computer system.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A computer-implemented method of using an input/output time parameter to represent a number of tokens in a token bucket in order to enforce a maximum rate limit for input/output operations directed to a storage resource, comprising executing, on at least one processor, the steps of:
    setting a minimum permitted input/output operation inter-arrival time period to an inverse of the maximum rate limit;
    processing an initially received input/output operation by setting the input/output time parameter to an arrival time of the initial input/output operation; and
    processing each subsequently received input/output operation by
        setting an inter-arrival time period parameter to a difference between an arrival time of the received input/output operation and the input/output time parameter,
        determining whether the inter-arrival time period parameter is less than the minimum permitted input/output operation inter-arrival time, and
        in response to determining that the inter-arrival time period parameter is not less than the minimum permitted input/output operation inter-arrival time, determining that there is at least one token available in the token bucket and accordingly allowing the input/output operation to be performed on the storage resource, and decrementing the number of tokens in the token bucket by adding the minimum permitted input/output operation inter-arrival time to the input/output time parameter.

2. The method of claim 1, wherein processing each subsequently received input/output operation further includes:
    in response to determining that the inter-arrival time period parameter is less than the minimum permitted input/output operation inter-arrival time, determining that there is not at least one token available in the token bucket, and accordingly preventing the input/output operation from being performed on the storage resource.

3. The method of claim 1, wherein processing each subsequently received input/output operation further includes:
    in response to determining that the inter-arrival time period parameter is not less than the minimum permitted input/output operation inter-arrival time, and after decrementing the number of tokens in the token bucket by adding the minimum permitted input/output operation inter-arrival time to the input/output time parameter, limiting the number of tokens in the token bucket to the size of an input/output operation burst size limit for input/output operations directed to the storage resource by
    comparing the input/output time parameter to the arrival time of the received input/output operation,
    comparing a difference between the arrival time of the received input/output operation and the input/output time parameter to the result of multiplying the burst size limit and the minimum permitted input/output operation inter-arrival time, and
    in response to determining that the value of the input/output time parameter is less than the arrival time of the received input/output operation and that the difference between the arrival time of the received input/output operation and the input/output time parameter is greater than the result of multiplying the burst size limit and the minimum permitted input/output operation inter-arrival time, setting the number of tokens in the token bucket to the size of an input/output operation burst size limit for input/output operations directed to the storage resource by setting the value of the input/output time parameter to the arrival time of the received input/output operation minus the result of multiplying the burst size limit and the minimum permitted input/output operation inter-arrival time.

4. The method of claim 1, wherein processing the initially received input/output operation further includes setting the number of tokens in the token bucket to the size of an input/output operation burst size limit for input/output operations directed to the storage resource by subtracting the result of multiplying the burst size limit and the minimum permitted input/output operation inter-arrival time from the input/output time parameter.

5. A computerized system for using an input/output time parameter to represent a number of tokens in a token bucket in order to enforce a maximum rate limit for input/output operations directed to a storage resource, comprising:
    at least one hardware processor;
    a memory having program code stored thereon, wherein the program code, when executed by the processor, causes the processor to
    set a minimum permitted input/output operation inter-arrival time period to an inverse of the maximum rate limit;
    process an initially received input/output operation by setting the input/output time parameter to an arrival time of the initial input/output operation; and
    process each subsequently received input/output operation by
        setting an inter-arrival time period parameter to a difference between an arrival time of the received input/output operation and the input/output time parameter,
        determining whether the inter-arrival time period parameter is less than the minimum permitted input/output operation inter-arrival time, and
        in response to determining that the inter-arrival time period parameter is not less than the minimum permitted input/output operation inter-arrival time, determining that there is at least one token available in the token bucket and accordingly allowing the input/output operation to be performed on the storage resource, and decrementing the number of tokens in the token bucket by adding the minimum permitted input/output operation inter-arrival time to the input/output time parameter.

6. The system of claim 5, wherein the program code, when executed on the processor, further causes the processor to process each subsequently received input/output operation further by, in response to determining that the inter-arrival time period parameter is less than the minimum permitted input/output operation inter-arrival time, determining that there is not at least one token available in the token bucket, and accordingly preventing the input/output operation from being performed on the storage resource.

7. The system of claim 5, wherein the program code, when executed on the processor, causes the processor to further process each subsequently received input/output operation further by:
in response to determining that the inter-arrival time period parameter is not less than the minimum permitted input/output operation inter-arrival time, and after decrementing the number of tokens in the token bucket by adding the minimum permitted input/output operation inter-arrival time to the input/output time parameter, limiting the number of tokens in the token bucket to the size of an input/output operation burst size limit for input/output operations directed to the storage resource by
comparing the input/output time parameter to the arrival time of the received input/output operation,
comparing a difference between the arrival time of the received input/output operation and the input/output time parameter to the result of multiplying the burst size limit and the minimum permitted input/output operation inter-arrival time, and
in response to determining that the value of the input/output time parameter is less than the arrival time of the received input/output operation and that the difference between the arrival time of the received input/output operation and the input/output time parameter is greater than the result of multiplying the burst size limit and the minimum permitted input/output operation inter-arrival time, setting the number of tokens in the token bucket to the size of an input/output operation burst size limit for input/output operations directed to the storage resource by setting the value of the input/output time parameter to the arrival time of the received input/output operation minus the result of multiplying the burst size limit and the minimum permitted input/output operation inter-arrival time.

8. The system of claim 5, wherein the program code, when executed on the processor, further causes the processor to process the initially received input/output operation by setting the number of tokens in the token bucket to the size of an input/output operation burst size limit for input/output operations directed to the storage resource by subtracting the result of multiplying the burst size limit and the minimum permitted input/output operation inter-arrival time from the input/output time parameter.

9. A non-transitory computer readable medium for using an input/output time parameter to represent a number of tokens in a token bucket in order to enforce a maximum rate limit for input/output operations directed to a storage resource, the non-transitory medium having instructions stored thereon, that when executed on a processor of a computer, perform the steps of:
setting a minimum permitted input/output operation inter-arrival time period to an inverse of the maximum rate limit;

processing an initially received input/output operation by setting the input/output time parameter to an arrival time of the initial input/output operation; and
processing each subsequently received input/output operation by
setting an inter-arrival time period parameter to a difference between an arrival time of the received input/output operation and the input/output time parameter,
determining whether the inter-arrival time period parameter is less than the minimum permitted input/output operation inter-arrival time, and
in response to determining that the inter-arrival time period parameter is not less than the minimum permitted input/output operation inter-arrival time, determining that there is at least one token available in the token bucket and accordingly allowing the input/output operation to be performed on the storage resource and decrementing the number of tokens in the token bucket by adding the minimum permitted input/output operation inter-arrival time to the input/output time parameter.

10. The non-transitory computer-readable medium of claim 9, wherein the instructions stored thereon, when executed on a processor of a computer, further perform the step of processing each subsequently received input/output operation by:
in response to determining that the inter-arrival time period parameter is less than the minimum permitted input/output operation inter-arrival time, determining that there is not at least one token available in the token bucket, and accordingly preventing the input/output operation from being performed on the storage resource.

11. The non-transitory computer-readable medium of claim 9, wherein the instructions stored thereon, when executed on a processor of a computer, further perform the step of processing each subsequently received input/output operation by:
in response to determining that the inter-arrival time period parameter is not less than the minimum permitted input/output operation inter-arrival time, and after decrementing the number of tokens in the token bucket by adding the minimum permitted input/output operation inter-arrival time to the input/output time parameter, limiting the number of tokens in the token bucket to the size of an input/output operation burst size limit for input/output operations directed to the storage resource by
comparing the input/output time parameter to the arrival time of the received input/output operation,
comparing a difference between the arrival time of the received input/output operation and the input/output time parameter to the result of multiplying the burst size limit and the minimum permitted input/output operation inter-arrival time, and
in response to determining that the value of the input/output time parameter is less than the arrival time of the received input/output operation and that the difference between the arrival time of the received input/output operation and the input/output time parameter is greater than the result of multiplying the burst size limit and the minimum permitted input/output operation inter-arrival time, setting the number of tokens in the token bucket to the size of an input/output operation burst size limit for input/output operations directed to the storage resource by setting the value of the input/output time parameter to the arrival time of the received input/output operation minus the result of multiplying the burst size limit and the minimum permitted input/output operation inter-arrival time.

12. The non-transitory computer-readable medium of claim 9, wherein the instructions stored thereon, when executed on a processor of a computer, further perform the step of processing the initially received input/output operation by setting the number of tokens in the token bucket to the size of an input/output operation burst size limit for input/output operations directed to the storage resource by subtracting the result of multiplying the burst size limit and the minimum permitted input/output operation inter-arrival time from the input/output time parameter.

* * * * *